United States Patent
Macpherson

[11] Patent Number: 5,313,124
[45] Date of Patent: May 17, 1994

[54] RETURN PLATE FOR A VOICE COIL MOTOR IN A DISK DRIVE

[75] Inventor: Aaron S. Macpherson, Fort Collins, Colo.

[73] Assignee: Maxtor Corporation, San Jose, Calif.

[21] Appl. No.: 997,776

[22] Filed: Dec. 28, 1992

[51] Int. Cl.⁵ ............... H02K 41/02; H02K 15/14; G11B 33/00

[52] U.S. Cl. ....................... 310/13; 310/42; 318/135; 360/106

[58] Field of Search ............ 360/106; 310/12, 13, 310/15, 17, 27, 42, 254, 36; 318/119, 135

[56] References Cited

U.S. PATENT DOCUMENTS

| | | | |
|---|---|---|---|
| 4,476,404 | 10/1984 | Bygdues | 310/27 |
| 4,620,252 | 10/1986 | Bauck et al. | 360/106 |
| 4,716,483 | 12/1987 | Walsh | 360/106 |
| 5,041,934 | 8/1991 | Stefansky et al. | 360/106 |
| 5,051,669 | 9/1991 | Hsiao et al. | 318/119 |
| 5,160,865 | 11/1992 | Gururangan | 310/67 R |
| 5,216,662 | 6/1993 | Stefansky et al. | 369/215 |

Primary Examiner—Steven L. Stephan
Assistant Examiner—D. R. Haszko
Attorney, Agent, or Firm—Blakely, Sokoloff, Taylor & Zafman

[57] ABSTRACT

A return plate for the voice coil motor of a disk drive is disclosed, wherein the angular positions of the top and bottom plates of the return plate are aligned by employing slot shaped voids and anchoring features. The bottom plate is anchored by a tight tolerance coupling to an actuator mounting boss in the base plate of the disk drive. The angular position of the bottom plate is controlled by a slot shaped hole that couples with a tight tolerance in a narrow dimension to an alignment boss in the base plate. The top plate is anchored to the base plate, and the angular position of the top plate is controlled by a slot shaped standoff that couples with a tight tolerance in a narrow dimension to the alignment boss.

16 Claims, 2 Drawing Sheets

RETURN PLATE FOR A VOICE COIL MOTOR IN A DISK DRIVE

FIELD OF THE INVENTION

The present invention pertains to the field of disk drives for mass storage of information in a computer system. More particularly, this invention relates to aligning the return plate for a voice coil motor in a disk drive.

BACKGROUND OF THE INVENTION

A typical disk drive employs a rotary actuator motor to move an actuator for positioning the read/write heads over a disk media. Magnetic flux for the rotary actuator motor is typically generated by a magnetic circuit comprising a return plate and a pair of magnets. The return plate is usually comprised of a top plate, a bottom plate, and several standoffs. The standoffs hold the top and bottom plates apart at a fixed distance to form an air gap for receiving an actuator coil coupled to the actuator. Typically, magnets are bonded to the inner walls of both the top and bottom plates. The return plate is usually coupled into the disk drive via a set of bosses formed in the base plate of the disk drive.

The top and bottom plates as well as the standoffs are typically constructed of a magnetic permeable material such as a low carbon steel. The top and bottom plates along with the standoffs form a flux return path for a magnetic field generated by the top and bottom magnets. The magnetic flux within the air gap between the magnets causes induces torque on the actuator according to an electric current flow in the actuator coil.

Typically, the top and bottom plates and the standoffs employ circular clearance holes for receiving the bosses formed in the base plate. The bosses extend through the clearance holes when the return plate is assembled into the base plate. The clearance holes have loose tolerances to compensate for the tolerances in the diameters of the bosses, and the tolerances in the locations of the bosses on the base plate. A screw is usually coupled through the actuator bearing to provide a pivot point for the top and bottom plates.

However, the circular clearance holes employed in prior return plate designs can cause misalignment between the top and bottom plates. The misalignment occurs when the angular position of the top plate around the pivot point differs from the angular position of the bottom plate around the pivot point. The differing angular positions of the top and bottom plates are a consequence of the loose tolerances of the circular clearance holes.

Unfortunately, the misalignment between the top and bottom plates causes a corresponding misalignment between the top and bottom magnets. The magnet misalignment reduces the linearity of actuator torque across the range of actuator movement over the disk media. The reduced linearity of the actuator must be compensated for by the servo control system, thereby increasing disk drive access time and reducing disk drive performance.

SUMMARY AND OBJECTS OF THE INVENTION

One object of the present invention is to align the top and bottom plates of a voice coil motor return plate.

Another object of the present invention is to align the top and bottom plates of a voice coil motor return plate in order to align the voice coil motor magnets.

Another object of the present invention is to align the top and bottom plates of the return plate in order to increase the linearity of actuator torque for the voice coil motor.

A further object of the present invention is to align the top and bottom plates of a voice coil motor return plate while employing a minimum number of tight tolerance features in the return plate.

These and other objects of the invention are provided by a voice coil motor return plate for a disk drive. The return plate has a bottom plate comprising a first hole and an alignment hole. The first hole anchors the bottom plate to a base plate of the disk drive. The alignment hole sets an angular position of the bottom plate. The return plate also has a top plate comprising a second hole and an alignment standoff. The second hole anchors the top plate to the base plate, and the alignment standoff sets an angular position of the top plate.

An alignment boss formed in the base plate is received by the alignment hole and the alignment standoff to align the angular position of the top plate to the angular position of the bottom plate. The alignment hole has a slot shape that has a tight tolerance to the alignment boss in a narrow dimension. The alignment standoff forms a slot shape opening that has a tight tolerance to the alignment boss in a narrow dimension.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A return plate for the voice coil motor of a disk drive is disclosed, wherein the angular positions of the top and bottom plates are aligned by employing slot shaped voids and anchoring features. The bottom plate is anchored by a tight tolerance coupling to an actuator mounting boss in the base plate of the disk drive. The angular position of the bottom plate is controlled by a slot shaped hole that couples with a tight tolerance in a narrow dimension to an alignment boss in the base plate. The top plate is anchored to the base plate, and the angular position of the top plate is controlled by a slot shaped standoff that couples with a tight tolerance in a narrow dimension to the alignment boss.

Figure 1:
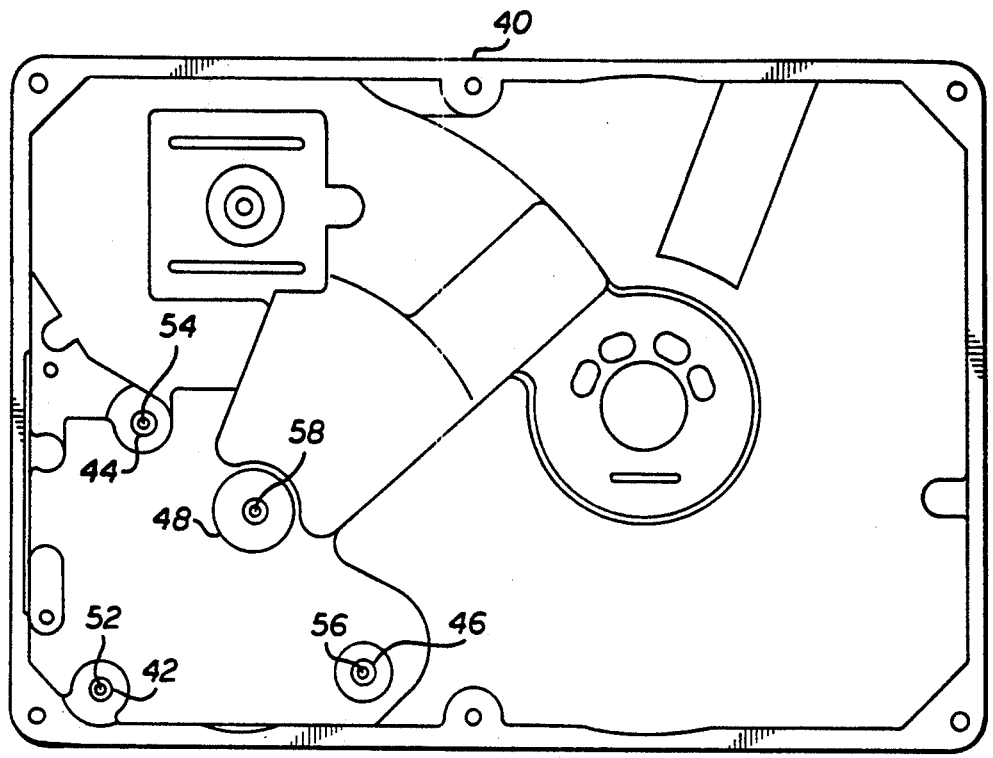
FIG. 1 is a top view of a disk drive base plate which holds the mechanical components for the disk drive.

FIG. 1 is a top view of a disk drive base plate 40. The base plate 40 holds the mechanical components for a disk drive. An alignment boss 42, an actuator mounting boss 48, and a pair of bosses 44 and 46 are formed on a bottom surface 41 of the base plate 40. For one embodiment, the alignment boss 42, the actuator mounting boss 48, and the bosses 44 and 46 are cylindrical machined features formed on the bottom surface 41 of the base plate 40.

Figure 2:
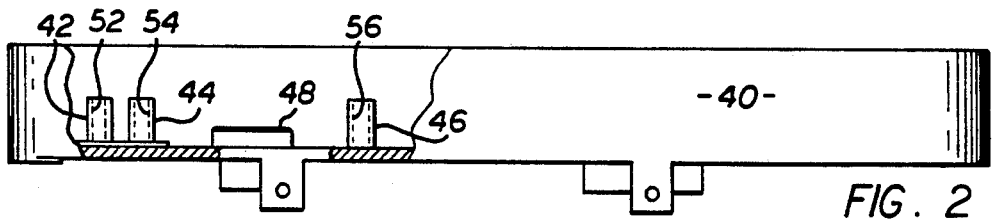
FIG. 2 is a side view of the base plate showing the alignment boss, the actuator mounting boss, as well as the clearance bosses.

FIG. 2 is a side view of the base plate 40 which shows the alignment boss 42, the actuator mounting boss 48, and the bosses 44 and 46. The alignment boss 42 has a threaded hole 52, the actuator mounting boss 48 has a counter bore with a smaller threaded hole 58 at the bottom, and the bosses 44 and 46 have threaded holes 54 and 56. The threaded holes are provided to receive screws (not shown) that couple a voice coil motor return plate to the base plate 40. The counter bore receives the actuator bearing shaft.

Figure 3A:
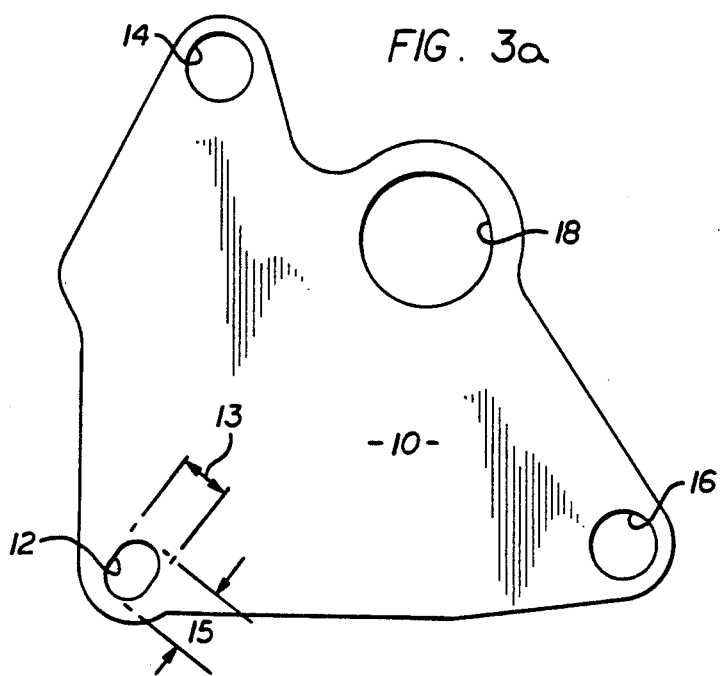
FIGS. 3a-3b illustrate a bottom plate for a voice coil motor return plate, wherein the return plate which has a slot shaped alignment hole, a pair of clearance holes, and a bottom alignment hole.
Figure 3B:
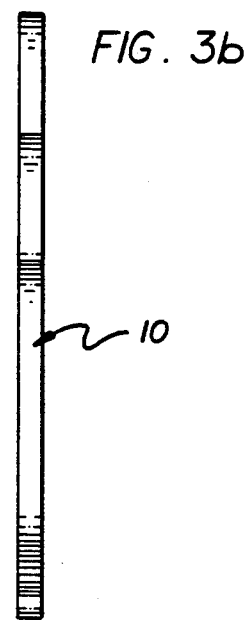

FIGS. 3a–3b illustrate a bottom plate 10 for a voice coil motor return plate. FIG. 3a shows a top view of the bottom plate 10, and FIG. 3b shows a side view of the bottom plate 10. The bottom plate 10 has a slot shaped alignment hole 12, a pair of clearance holes 14 and 16, and a bottom alignment hole 18.

When the bottom plate 10 is installed in the base plate 40, the bottom alignment hole 18 receives the actuator mounting boss 48. The bottom alignment hole 18 has a circular shape that provides a tight tolerance for receiving the actuator mounting boss 48. The coupling between the bottom alignment hole 18 and the actuator mounting boss 48 anchors the angular movement of the bottom plate 10. The clearance holes 14 and 16 receive the bosses 44 and 46. The clearance hole 14 has a circular shape that provides a loose tolerance for receiving the boss 44, and the clearance hole 16 has a circular shape that provides a loose tolerance for receiving the boss 46.

The alignment hole 12 has a slotted shape with a wide dimension 15 extending toward the center of the bottom alignment hole 18, and a narrow dimension 13 extending perpendicular to the wide dimension 15. When the bottom plate 10 is installed in the base plate 40, the alignment hole 12 receives the alignment boss 42. The alignment hole 12 provides a tight tolerance to the diameter of the alignment boss 42 in the narrow dimension 13, and a loose tolerance to the diameter of the alignment boss 42 in the wide dimension 15.

The tight tolerance between the diameter of the alignment boss 42 and the narrow dimension 13 of the alignment hole 12 determines the angular position of the bottom plate 10 around the actuator mounting boss 48. The tight tolerance between the bottom alignment hole 18 and the diameter of the actuator mounting boss 48 reduces excess movement of the bottom plate 10.

For one embodiment, the bottom plate 10 is formed by a metal stamping process. The metal stamping process forms the hole pattern including the slot shaped alignment hole 12, the clearance holes 14 and 16, and the bottom alignment hole 18.

Figure 6:
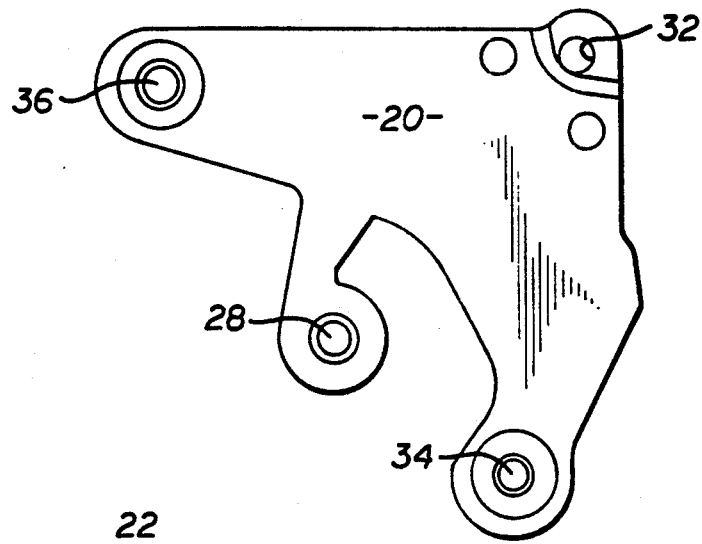
FIG. 6 is a top view of the top plate, and shows the circular shaped clearance openings, and the top pivot hole.
Figure 5:
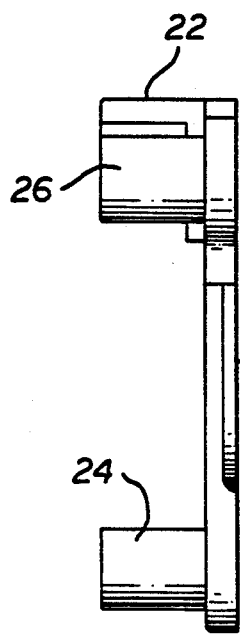
FIG. 5 is a side view of the top plate, and shows the alignment standoff, the clearance standoffs, and the top pivot hole.
Figure 4:
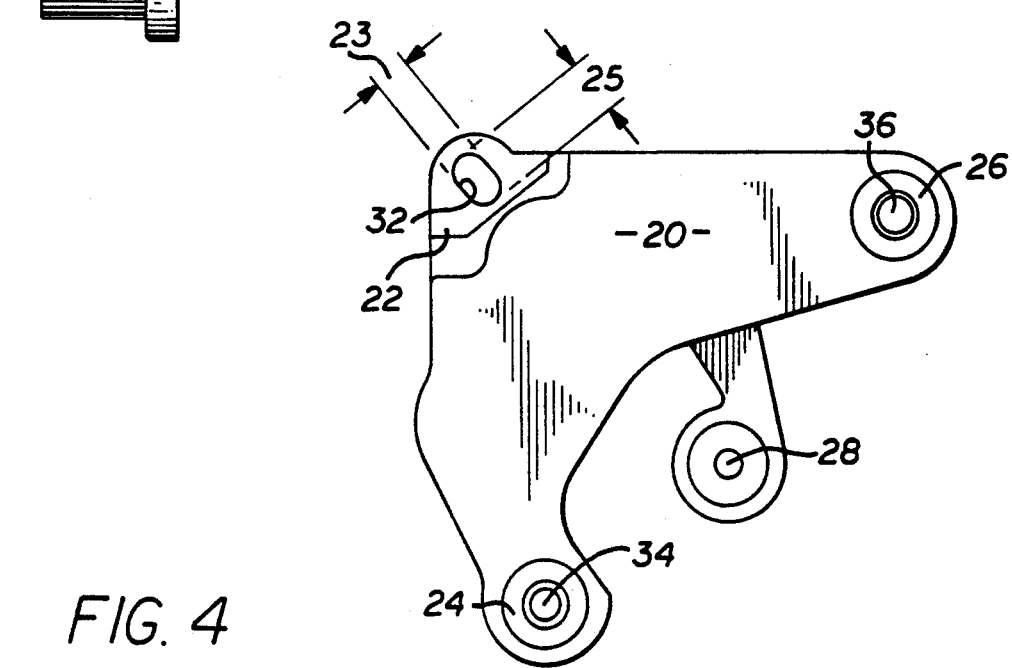
FIG. 4 is a bottom view of the top plate of a voice coil motor return plate, and shows the slot shaped alignment standoff, a pair of clearance standoffs, and a top pivot hole.

FIGS. 4–6 illustrate a top plate 20 of the voice coil motor return plate. FIG. 4 is a bottom view of the top plate 20 showing an alignment standoff 22, a pair of clearance standoffs 24 and 26, and a top pivot hole 28. For one embodiment, the alignment standoff 22 and the clearance standoffs 24 and 26 are formed by a plastic injection molding process.

For another embodiment, the top plate 20 and the clearance standoffs 24 and 26 are formed by metal injection molding (MIM) process. The alignment standoff 22 is also formed by MIM. The standoffs 24 and 26 and the top plate 20 are one piece with all of the features disclosed above.

The clearance standoff 24 forms a circular shaped clearance opening 34, and the clearance standoff 26 forms a circular shaped clearance opening 36. When the top plate 20 is installed over the bottom plate 10 inside the base plate 40, the clearance openings 34 and 36 receive the bosses 44 and 46, respectively. The circular shape of the clearance opening 34 provides a loose tolerance for receiving the boss 44, and the circular shape of the clearance opening 36 provides a loose tolerance for receiving the boss 46.

The alignment standoff 22 forms a slot shaped alignment opening 32 with a wide dimension 25 extending toward the center of the top pivot hole 28, and a narrow dimension 23 extending perpendicular to the wide dimension 25. When the top plate 20 is installed over the bottom plate 10 inside the base plate 40, the alignment opening 32 receives the alignment boss 42. The slotted shape of the alignment opening 32 provides a tight tolerance for receiving the alignment boss 42 in the narrow dimension 23, and a loose tolerance for receiving the alignment boss 42 in the wide dimension 25.

A screw (not shown) is coupled through the top pivot hole 28 to the threaded hole 58 in the actuator mounting boss 48 to anchor the angular movement of the top plate 20. The tight tolerance between the diameter of the alignment boss 42 and the narrow dimension 23 of the alignment opening 32 determines the angular position of the top plate 20 around the top pivot hole 28.

FIG. 5 is a side view of the top plate 20 which shows the alignment standoff 22, the clearance standoffs 24 and 26, and the top pivot hole 28. FIG. 6 is a top view of the top plate 20 which shows the circular shaped opening 32 for receiving a mounting screw, the circular shaped openings 34 and 36 for receiving mounting screws, and the top pivot hole 28 for receiving a mounting screw.

The alignment opening 32, the clearance openings 34 and 36, and the top pivot hole 28 each implement a counter sink for receiving a counter sink screw. Alternatively, many other types of screws may be employed. The alignment opening 32 receives a screw (not shown) that couples to the threaded hole 52 of the alignment boss 42. The clearance openings 34 and 36 receive screws (not shown) that couple to the threaded holes 54 and 56 of the bosses 44 and 46.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A voice coil motor return plate for a disk drive, comprising:
    a bottom plate comprising a first hole and an alignment hole, the first hole for anchoring an angular position of the bottom plate to a base plate of the disk drive, the alignment hole for setting an angular position of the bottom plate;

a top plate comprising a second hole and an alignment standoff, the second hole for anchoring an angular position of the top plate to the base plate, the alignment standoff for setting an angular position of the top plate;

an alignment boss formed in the base plate, the alignment hole and the alignment standoff receiving the alignment boss such that the alignment boss determines the angular position of the bottom plate and the angular position of the top plate.

2. A voice coil motor return plate for a disk drive, comprising:

a bottom plate comprising a first hole and an alignment hole, the first hole for anchoring the bottom plate to a base plate of the disk drive, the alignment hole for setting an angular position of the bottom plate, the alignment hole having a slot shape, the slot shape of the alignment hole having a wide dimension extending toward the first hole and a narrow dimension extending perpendicular to the wide dimension;

a top plate comprising a second hole and an alignment standoff, the second hole for anchoring the top plate to the base plate, the alignment standoff for setting an angular position of the top plate;

an alignment boss formed in the base plate, such that the alignment hole and the alignment standoff receive the alignment boss.

3. The voice coil motor return plate of claim 2, wherein the narrow dimension of the alignment hole receives the alignment boss with a tight tolerance, and the wide dimension of the alignment hole receives the alignment boss with a loose tolerance.

4. The voice coil motor return plate of claim 3, wherein the alignment standoff forms an alignment opening having a slot shape, the slot shape of the alignment opening having a wide dimension extending toward the second hole and a narrow dimension extending perpendicular to the wide dimension.

5. The voice coil motor return plate of claim 4, wherein the narrow dimension of the alignment opening receives the alignment boss with a tight tolerance, and the wide dimension of the alignment opening receives the alignment boss with a loose tolerance.

6. The voice coil motor return plate of claim 5, wherein the first hole receives an actuator mounting boss formed in the base plate, such that the first hole receives the actuator mounting boss with a tight tolerance.

7. The voice coil motor return plate of claim 6, wherein the bottom plate further comprises at least one clearance hole, each clearance hole having a circular shape for receiving a boss formed in the base plate, such that each clearance hole receives one of the bosses with a loose tolerance.

8. The voice coil motor return plate of claim 7, wherein the top plate further comprises at least one clearance standoff, each clearance standoff forming a cylindrical shaped opening for receiving one of the bosses, such that each cylindrical shaped opening receives one of the bosses with a loose tolerance.

9. A method for coupling a voice coil motor return plate into a disk drive, comprising the steps of:

forming a first hole and an alignment hole in a bottom plate of the return plate, the first hole for anchoring an angular position of the bottom plate to a base plate of the disk drive, the alignment hole for setting an angular position of the bottom plate;

forming a second hole and an alignment standoff in a top plate of the return plate, the second hole for anchoring an angular position of the top plate to the base plate, the alignment standoff for setting an angular position of the top plate;

forming an alignment boss in the base plate, and coupling the alignment hole and the alignment standoff onto the alignment boss such that the alignment boss determines the angular position of the bottom plate and the angular position of the top plate.

10. A method for coupling a voice coil motor return plate into a disk drive, comprising the steps of:

forming a first hole and an alignment hole in a bottom plate of the return plate, the first hole for anchoring the bottom plate to a base plate of the disk drive, the alignment hole for setting an angular position of the bottom plate, the alignment hole having a slot shape, the slot shape of the alignment hole having a wide dimension extending toward the first hole and a narrow dimension extending perpendicular to the wide dimension;

forming a second hole and an alignment standoff in a top plate of the return plate, the second hole for anchoring the top plate to the base plate, the alignment standoff for setting an angular position of the top plate;

forming an alignment boss in the base plate, and coupling the return plate to the base plate such that the alignment hole and the alignment standoff receive the alignment boss.

11. The method of claim 10, wherein the narrow dimension of the alignment hole receives the alignment boss with a tight tolerance, and the wide dimension of the alignment hole receives the alignment boss with a loose tolerance.

12. The method of claim 11, wherein the alignment standoff forms an alignment opening having a slot shape, the slot shape of the alignment opening having a wide dimension extending toward the second hole and a narrow dimension extending perpendicular to the wide dimension.

13. The method of claim 12, wherein the narrow dimension of the alignment opening receives the alignment boss with a tight tolerance, and the wide dimension of the alignment opening receives the alignment boss with a loose tolerance.

14. The method of claim 13, wherein the first hole receives an actuator mounting boss formed in the base plate, such that the first hole receives the actuator mounting boss with a tight tolerance.

15. The method of claim 14, further comprising the steps of forming at least one clearance hole in the bottom plate, and forming at least one boss in the base plate, each clearance hole having a circular shape for receiving one of the bosses with a loose tolerance.

16. The method of claim 15, further comprising the step of forming at least one clearance standoff on the top plate, each clearance standoff forming a cylindrical shaped opening for receiving one of the bosses with a loose tolerance.

* * * * *